United States Patent Office 3,406,123
Patented Oct. 15, 1968

3,406,123
CATALYSTS AND THEIR METHOD OF PREPARATION
Eugene E. Sensel, Beacon, and Edward L. Cole, Fishkill, N.Y., assignors to Texaco Inc., New York, N.Y., a corporation of Delaware
No Drawing. Filed Sept. 15, 1965, Ser. No. 487,586
21 Claims. (Cl. 252—455)

ABSTRACT OF THE DISCLOSURE

Zeolite type molecular sieve catalysts containing a heavy metal compound in the unit crystallographic cells of the zeolite are prepared by introducing a multivalent heavy metal ion into a cation position of a zeolite by ion exchange and thereafter substituting a monovalent cation for the multivalent heavy metal ion by ion exchange with a solution of compound of a monovalent metal cation and a metal-containing anion whereby a compound of the multivalent heavy metal cation and the metal containing anion is formed within the unit cell structure of the zeolite. Subsequent to formation of the complex heavy metal compound in the unit cells, the monovalent cation may be displaced without displacement of the heavy metal compound by decationization of the zeolite.

---

This invention relates to a novel method of preparing molecular sieve catalysts and to novel catalysts so prepared. In one of its more specific aspects, this invention relates to methods of preparing molecular sieve catalysts containing a metal-containing active catalyst component in which the metal catalyst component is formed within the unit cell of the zeolite.

The method of this invention is particularly useful for the preparation of catalysts for hydrocarbon conversion reactions, for example, hydrogenation, including hydrocracking, catalytic cracking, dehydrogenation, desulfurization, alkylation, isomerization, and polymerization. The catalysts prepared by the method of this invention comprise individual and discrete molecules and small aggregates of individual molecules of a metal-containing catalyst component, e.g., cobalt tungstate, contained within the unit cell and adjacent to the active sites of the alumino-silicate crystal lattice. In contrast, metal-containing catalyst components in association with molecular sieves prepared by impregnation techniques of the prior art result in the deposition of large crystals of the metal compound in a conglomerate structure usually on the gross, external surface of the molecular sieve, or zeolite. Catalysts prepared by the method of this invention are in general more active, and less subject to deactivation or loss of the catalytic material from the support structure than are catalysts prepared by impregnation procedures.

The catalytic properties and advantages of molecular sieves in hydrocarbon conversion processes are already widely recognized. The 4A and 5A zeolites, having pore diameters of about 4 A. and 5 A. respectively, have been used for the separation of hydrocarbons according to the size of the hydrocarbon molecule and, in some instances, also to effect catalytic conversion of hydrocarbons. The type X and type Y zeolites are usually preferable as molecular sieve catalysts and as components of catalysts. Both type X and type Y zeolites have sufficiently large pore sizes at the temperatures used for hydrocarbon conversion reactions to allow ready access of the hydrocarbons to the unit cells of the crystal and to permit rapid desorption of product. The aperture of type 13X zeolite, determined crystallographically, has been reported in J. Am. Chem. Soc., 82, 1041 (1960) as ellipsoidal or as a distorted ring, with cross section dimensions of 7.41 and 7.52 A. The effective pore size varies somewhat with temperature, increasing as the temperature increases.

The molecular sieves tend to have more or less catalytic activity for hydrocarbon conversion reactions, depending to some extent upon their molecular structures and compositions. Type Y structures generally have higher activity for reactions involving cracking than do the type X structure. Type X molecular sieves contain from 1.1 to 1.4 atoms of silicon for each atom of aluminum whereas the type Y sieves contain 1.5 to 2.5 atoms of silicon for each atom of aluminum. Naturally occurring crystalline zeolites are hydrous alkali or alkaline earth aluminosilicates, usually sodium aluminosilicates or sodium calcium aluminosilicates. Synthetic type A and types X and Y zeolites are usually produced in sodium forms, but can also be prepared in lithium or potassium forms, e.g., lithium aluminosilicates and potassium aluminosilicates. Alkali metal ions in the zeolite structure may be ion exchanged with other cations, e.g., calcium to increase the catalytic activity of the molecular sieve. Hydrogen may be substituted for sodium and other ions by treatment of the zeolite with dilute acids, e.g., hydrochloric acid, or by ion exchange with a water soluble ammonium compound, e.g., ammonium chloride, followed by water washing, e.g. to remove sodium chloride. The ammonium substituted zeolite is heated to decompose the ammonium cation and liberate ammonia. So-called decationized forms of certain aluminosilicate molecular sieves may be prepared by calcining the hydrogen forms to split off water. The decationized structures comprise active acid centers possessing catalytic activity for reactions involving cracking of the hydrocarbon molecule.

It has been known heretofore to replace sodium ions of type A sodium zeolite with other ions, such as hydrogen, lithium, potassium, silver, calcium, strontium, metal ions of the transition series, such as manganese and nickel, and ammonium ions. It has also been known heretofore to impregnate type X and type Y zeolites with water soluble metal compounds, e.g., ammonium molybdate, under conditions which minimize ion exchange with the ion in the framework structure and to evaporate water and calcine the laden zeolite to deposit the metal salt on the zeolite.

In accordance with the present invention, water-insoluble metal-containing catalytically active compounds are formed within the unit cell of the molecular sieve framework as single dispersed molecules or small aggregates of these molecules having high catalytic activity. The resulting catalysts have high activity, are unaffected by water, and highly resistant to nitrogen compounds and sulfur compounds which normally adversely affect the activity of catalysts of this type. This method of preparing catalysts is applicable to type X zeolites, type Y zeolites, faujasite, mordenite, clinoptilolite and the like.

The resulting catalysts are useful in carrying out numerous reactions, especially hydrocarbon conversion reactions including hydrocracking, catalytic cracking, hydrorefining, hydrodesulfurization, oxidation, cracking, isomerization, and hydrogenation reactions. The catalysts are particularly useful for hydrocracking of kerosene, gas oils, and other similar petroleum distillate fractions, and for hydrorefining and hydrodesulfurization of lubricating oil fractions.

It is an object of this invention to provide a novel catalyst, suitable for the catalytic treatment of hydrocarbons, employing zeolite type metallo-aluminosilicate bases. Another object of this invention is to provide catalysts which exhibit high catalytic activity in the presence of water, sulfur compounds and nitrogen compounds. Still another object is to provide a novel method for the preparation of zeolite-based catalysts in which catalytic metal compounds are formed in the unit cells of the zeolite structure. A further object is to provide a method for the preparation of heavy metal compounds within the unit cells of zeolite type metallo-aluminosilicates. Still another object is to provide zeolite based catalyst structures which are especially active for the treatment of hydrocarbon distillates boiling within the gas oil range to produce high yields of gasoline boiling range hydrocarbons and lube oil base products.

Other objects and advantages of this invention will be apparent from the following detailed description of the method of preparation of the catalyst and the conversion of higher boiling petroleum distillates in the presence of these catalysts to products boiling within the gasoline boiling range and lube oil base products.

The process of this invention is useful in the preparation of catalysts comprising compounds of metal cations of the group consisting of copper, zinc, silver, cadmium, and transition metals with metal-containing anions comprising tungsten, molybdenum, chromium, vanadium, titanium, and manganese, in combination with chalcogens comprising oxygen and sulfur, including simple salts, e.g., cobalt tungstate, nickel sulfotungstate; complex salts, e.g. silver hydroxylamine tungstate, dehydrated forms of the anions, e.g. copper metatungstate, zinc paratungstate, polymeric forms of the anions, e.g., ferric di-, tri-, tetra-, and pentatungstate. In the foregoing the tungstates have been used as specific examples; it will be understood that chromates, molybdates and vanadates and the corresponding sulfur compounds may be employed as well as the tungstates and thiotungstates. The transition metals include vanadium, chromium, manganese, iron, cobalt, nickel, molybdenum, rhodium, palladium, the lanthanide series (i.e., rare earth metals), tungsten, rhenium, osmium, iridium, platinum, and thorium.

Our method of preparation involves the following steps. Synthetic or natural zeolite having at least one group of relatively large pores of like dimensions in the range of about 7 to 13 A. sufficient to admit large hydrocarbon molecules, e.g., type X, faujasite, mordenite, clinoptilolite, type Y, and the like, is subjected to ion exchange with water soluble salts of multivalent metal ions in aqueous solution whereby the alkali metal or other parent or original ions of the zeolite are replaced, wholly or in part, by multivalent metal cations to prepare a metal-substituted molecular sieve zeolite structure. The metal-substituted zeolite is then treated with an aqueous solution of an alkali metal salt or an ammonium salt of a metal-containing anion by ion exchange whereby at least some of the multivalent metal ion substituents in the zeolite are replaced with monovalent alkali metal ions or ammonium ions in the solution with the simultaneous formation and precipitation of the heavy metal salt within the unit cells of the zeolite.

The laden zeolite containing the insoluble metal salt may be heated to precondition the catalyst. When an alkali metal salt is used in the second ion exchange step, the catalyst laden zeolite is preferably further treated by ion exchange with a soluble ammonium salt, e.g., ammonium chloride, before the heating step whereby sodium or other alkali metal cations associated with the zeolite are replaced with ammonium ions, and the structure is then heated to drive off ammonia, and optionally, to drive off water if a decationized catalyst is desired. Alternatively, the alkali metal cation may be replaced with hydrogen ions by treatment with dilute acid, e.g., dilute hydrochloric acid.

In an alternate method of preparation, a large pore size sodium zeolite is ion exchanged with a water soluble ammonium salt, e.g., ammonium chloride to produce the ammonium form of the zeolite, then with the multivalent metal salt, e.g., nickel chloride, to form the metal zeolite and then with a water soluble ammonium compound of the metal-containing anion, e.g. ammonium thiotungstate, to produce an ammonium zeolite laden with the multivalent metal salt of the metal-containing anion, e.g., nickel thiotungstate, in the unit cells of the aluminosilicate. The catalyst laden ammonium zeolite may be heated to drive off ammonia, and optionally, also water to produce the hydrogen form or decationized form of the aluminosilicate laden with catalyst. In this method of preparation, the ammonium ion is introduced into the zeolite before the unit cells are loaded with the insoluble catalyst compound or compounds. Use of the ammonium compound of the metal-containing anion avoids reintroducing sodium ions into the zeolite.

In still another method, the unit cells of molecular sieve are loaded with a mixture of catalytic materials comprising multivalent metal salts of metal-containing anions with (1) the oxide or sulfide of a multivalent metal or (2) the multivalent metal, per se. This is accomplished by treating a multivalent metal substituted zeolite with a water soluble salt of a metal-containing anion and with a water soluble hydroxide or a water soluble salt of a weak acid, e.g., a carbonate or oxalate of an alkali metal or ammonium,. In an example of this procedure, starting with a sodium zeolite of large pore size, e.g., a type Y zeolite, a catalyst laden with a mixture of cobalt thiotungstate and cobalt in the form of its oxide or sulfide, or in metallic form by reduction of the oxide or sulfide, is produced as follows. The sodium zeolite is ion exchanged with cobalt chloride to replace sodium ions with cobalt ions. The resulting cobalt substituted zeolite is then ion exchanged with a solution of ammonium tetrathiotungstate and ammonium hydroxide to yield an ammonium zeolite laden with cobalt thiotungstate and cobalt hydroxide. The resulting ammonium zeolite is heated to drive off ammonia to form the hydrogen zeolite and at the same time convert the cobalt hydroxide to cobalt oxide, which can be selectively reduced, if desired, to metallic cobalt.

As another example of this latter method of making catalyst, a type Y sodium zeolite is ion exchanged with an aqueous solution of nickel sulfate; the nickel-substituted zeolite is then ion exchanged with a solution of sodium tungstate and sodium carbonate to yield the sodium zeolite laden with a mixture of nickel tungstate and nickel carbonate; the laden sodium zeolite is then ion exchanged with ammonium sulfate to replace the sodium ions with ammonium ions and produce the ammonium form of the zeolite; and finally the ammonium zeolite is heated to produce the hydrogen form of the molecular sieve laden with nickel tungstate and nickel oxide in the unit cells.

In still another alternate method of preparation procedure, the sodium zeolite laden with nickel tungstate and nickel carbonate in the above example may be ion exchanged with an aqueous solution of a rare earth compound, e.g., compounds of cerium, lanthanum, praseodymium, to yield a rare earth substituted type Y zeolite structure laden with nickel tungstate and nickel carbonate.

The final heating step may be carried out during actual use of the catalyst or as a preconditioning step after the catalyst is loaded into the reactor.

Throughout this specification, where reference is made to sodium zeolite it is to be understood that other alkali metal zeolites may be employed instead of the sodium form.

Although there is no precise information as to the exact mechanism of the reactions which take place within the unit cells in the formation of the catalyst, the following theory is offered as a possible explanation of the reaction mechanism. When the metal cations, for example, cobalt cations contained within the zeolite framework react with the water-soluble metal containing anion to form, for example, cobalt tungstate, those cations reacted can no longer function to satisfy the electrostatic requirements of the aluminosilicate framework structure of the zeolite. In reacting with the tungstate anions, at least part of the cobalt ions leave the cation positions in the zeolite and these sites are then occupied by alkali metal or ammonium ions and possibly by some hydrogen ions.

Sodium ions generally are not desirable components in zeolite catalysts. When a sodium salt is used, the sodium ions may be subsequently reduced in quantity or eliminated after the insoluble metal compound is precipitated in the unit cell of the zeolite by subjecting the laden zeolite to ion exchange with a water soluble ammonium salt in aqueous solution, e.g., ammonium chloride, to replace sodium cations with ammonium cations. Alternatively, the sodium cations may be replaced with other desirable ions, e.g., nickel, manganese, calcium, cobalt, zinc, magnesium, and the rare earth ions by ion exchange using a suitable water soluble salt, e.g., chlorides of the desired metal, for example, nickel chloride. Where it is desired to have hydrogen ions in the cation position or where it is desired to produce so-called decationized zeolites, the ammonium-substituted zeolite is heated to drive off ammonia leaving a hydrogen form of the zeolite with active Brönsted acid sites, or calcined, i.e., heated to a higher temperature, to split off hydrogen, as water, to yield the decationized form having active Lewis acid sites.

In the step of forming the metal catalyst salts in the unit cells, it is desirable to employ water soluble salts of metal containing anions, including the simple salts, e.g. sodium tungstate; complex salts, e.g., ammonium hydroxylamine tungstate; the sulfur analogs of the anions, e.g. ammonium sulfotungstate; the dehydrated forms of the anions, e.g. sodium meta- and paratungstates; polymeric forms of the anions, e.g., sodium di-, tri-, tetra-, and pentatungstates. Similarly, the water soluble salts of anions of molybdenum, chromium, vanadium, titanium, and manganese may be used. Alternatively, water soluble potassium, ammonium or quaternary ammonium salts may be employed in place of the sodium salts.

The following is a specific example of a catalyst prepared in accordance wtih the method of this invention.

Catalyst preparation

A cobalt-exchanged type Y zeolite was first prepared by treating type Y sodium zeolite with cobalt chloride solution. The stoichiometric amount of cobalt for substitution of all the sodium in the zeolite, i.e., 747 grams of $CoCl_2 \cdot 6H_2O$ were dissolved in 4.5 liters of water contained in a 7-liter stainless steel beaker. Then 2000 grams of type Y hydrated sodium zeolite (Linde SK–40) were stirred in. The mixture was heated on an electric hot plate at about 175° F. for 4.5 hours with constant stirring. At the end of this time, the exchanged zeolite was separated from the aqueous solution by filtration, washed three times by stirring in separate batches of water and the wash water removed by filtration after each water wash.

The washed zeolite was then retreated with fresh $CoCl_2$ solution and the whole process repeated. The zeolite was given a total of eight such treatments. The zeolite from the eighth treatment was washed thoroughly until substantially free of chloride ions and dried at room temperature. Subsequent analyses of the exchanged zeolites showed the following results.

| Zeolite after treatment No.: | Percent replacement of the Na by Co |
|---|---|
| 2 | 63.8 |
| 4 | 65.7 |
| 6 | 68.6 |
| 8 | 70.9 |

From the above it is evident that one or two exchange treatments are adequate to effect the desired degree of replacement of the sodium ions with cobalt ions.

The cobalt-exchanged type Y zeolite was then partially laden with cobalt tungstate by the following procedure. 104.5 grams of sodium tungstate dihydrate $(Na_2WO_4 \cdot 2H_2O)$ were dissolved in 500 cc. of water. While stirring this solution at room temperature 285 grams of the cobalt-exchanged type Y zeolite were added. Mechanical stirring was continued for 4.7 hours. The zeolite was filtered off on a Buchner funnel, washed twice with water, and dried at room temperature.

The type Y zeolite, partially laden with cobalt tungstate and having most of its cation sites reoccupied by sodium ions, was now converted to an ammonium-exchanged type Y zeolite (partially laden with cobalt tungstate) as follows. 48 grams of ammonium chloride were dissolved in 500 cc. of water and 180 grams of powdered type Y sodium-cobalt zeolite, partially laden with cobalt tungstate as prepared above, were added. The mixture was mechanically stirred for 3 hours at 180–195° F. Following this, the zeolite was filtered off and washed twice with water. The washed zeolite was then retreated with fresh ammonium chloride solution, using the same conditions as were employed in the first treatment, to make a total of 5 exchange treatments. The zeolite from the fifth treatment was washed twice and then dried at room temperature.

The dried zeolite was screened to pass a number 18 U.S. Standard sieve, mixed with 2 weight percent hydrogenated corn oil as a binder and formed into $5/32''$ diameter cylindrical granules in a pelleting machine. The pellets were calcined in the air at 900° F. for 4 hours to burn out the binder.

In the above procedure for preparation of the catalyst ion exchange was carried out by successive batch contacting of the zeolite with the treating solutions. In the preparation of commercial batches of catalyst, continuous countercurrent contact between the zeolite and the salt solutions undergoing ion exchange is preferred. Countercurrent batch contacting may be used alternatively to conserve chemicals.

Catalyst evaluation

The above material was loaded into a continuous fixed bed reactor operating upflow. The catalyst was pretreated by heating to 750° F. in a flowing stream of hydrogen at 3000 p.s.i.g. pressure, and then holding under these conditions for four hours. A heavy distillate having the following properties was then charged.

| | |
|---|---|
| Gravity, ° API | 24.5 |
| Flash, COC,[1] ° F. | 460 |
| Fire, COC,[1] ° F. | 515 |
| Kinematic viscosity at 210° F., cs. | 9.35 |
| Sulfur, wt. percent | 0.67 |
| Nitrogen, p.p.m. | 667 |
| Carbon residue, wt. percent | 0.16 |
| Pour, ° F. | +105 |
| ASTM gas oil distillation, ° F.: | |
| IBP | 392 |
| 10% | 675 |
| 20% | 705 |
| 30% | 719 |
| 40% | 725 |
| 50% | 734 |
| 60% | 744 |
| 70% | 751 |
| 80% | 758 |
| 84% | 760 |

[1] Cleveland open cup.

Distillation Products, Inc. (DPI), vacuum distillation at 5 mm.—weight percent overhead at 310° F., 0.1.

After 57 hours of operation, substantial hydrocracking was secured under the following process conditions.

| | |
|---|---|
| Preheater temp., ° F. | 620 |
| Reactor temp., ° F. | 750 |
| Pressure, p.s.i.g. | 1500 |
| Liquid, v./v./hr. | 0.88 |
| $H_2$ rate, ft.³/hr. | 7300 |

The product from the unit was degassed and distilled in a Distillation Products, Inc., unit with the following results: DPI vacuum distillate at 5 mm.—wt. percent overhead at 310° F., 42.8.

The overhead gave the following tests.

| | |
|---|---|
| Sulfur, percent | 0.1 |
| Aniline point, ° F. | 108.3 |
| Fluorescent indicator adsorption analysis: | |
| Aromatics | 29.5 |
| Olefins | 1.5 |
| Saturates | 69.0 |
| ASTM distillation, ° F.: | |
| IBP | |
| 5% | 238 |
| 10% | 257 |
| 20% | 286 |
| 30% | 305 |
| 40% | 320 |
| 50% | 354 |
| 60% | 389 |
| 70% | 424 |
| 80% | 461 |
| 90% | 520 |
| 95% | 605 |
| EP | 627 |
| Recovery | 97.5 |
| Residue (coke) | 2.5 |

On the basis of these data, 66.5 percent by volume of the material boiled in the gasoline range, 400° F. end-point. On the basis of the heavy gas oil charge, this represents an approximate conversion to 400° F. EP gasoline of 28.2 percent. The product is high in aromatics, 29.5 percent.

The heavy oil bottoms were dewaxed and tested. Quite unexpectedly the viscosity index of the oil was high as shown by the following data.

| | Charge oil | Product oil |
|---|---|---|
| Stabilized oil yield, wt. percent | 100 | 57.3 |
| Dewaxing at −10° F. using 2.5:1 dilution,* 1.5:1 wash:* Dewaxed oil yield, wt. percent | 84.5 | 75.0 |
| Tests Dewaxed Oil: | | |
| Flash, COC, ° F | 475 | 445 |
| Fire, COC, ° F | 540 | 495 |
| Kinematic viscosity at 100° F., cs | 142.3 | 53.0 |
| Kinematic viscosity at 210° F., cs | 11.09 | 6.99 |
| Solid point, ° F | −16 | −3 |
| Carbon residue, wt. percent | 0.22 | 0.04 |
| Viscosity index | 58.0 | 96.5 |

*40% methylethylketone, 60% benzol (90%).

The above data clearly illustrates that the subject catalysts have merit, not only as hydrocracking catalysts, but also as hydrorefining catalysts.

We claim:

1. A method of preparing a zeolite type molecular sieve catalyst containing a heavy metal compound dispersed in the unit crystallographic cells which comprises introducing a multivalent heavy metal ion into a cation position of a zeolite by contacting a zeolite having at least one group of relatively large pores of like dimensions in the range of about 7 to 13 A. with a solution of a water soluble salt of said heavy metal, and thereafter subjecting the metal substituted zeolite to contact with a solution of a water soluble compound of a metal-containing anion and a cation selected from the group consisting of alkali metals and ammonium to form a compound of said metal ion and said metal-containing anion within the unit cells.

2. A method according to claim 1 wherein said metal anion is selected from the group consisting of chromates, vanadates, tungstates, molybdates and their sulfur-containing analogs.

3. A method according to claim 1 wherein said metal cation is selected from the group consisting of alkali metals, ammonium and quaternary ammonium.

4. A method according to claim 1 wherein said metal substituted zeolite is contacted also with a solution of a water soluble compound of a weak acid and a cation selected from the group consisting of alkali metals and ammonium to form a compound of said metal ion and an anion of said weak acid in said unit cells in admixture with said compound of said metal ion and said metal-containing anion.

5. A method according to claim 4 wherein said water soluble compound of said weak acid is the hydroxide of a cation selected from the group consisting of alkali metals and ammonium.

6. A method according to claim 4 wherein said water soluble compound of said weak acid is the carbonate of a cation selected from the group consisting of alkali metals and ammonium.

7. A method according to claim 4 wherein said water soluble compound of said weak acid is the oxalate of a cation selected from the group consisting of alkali metals and ammonium.

8. A method according to claim 1 wherein said zeolite containing said heavy metal compound is subjected to further treatment comprising ion exchange with an ammonium compound followed by heating of said ammonium zeolite structure to drive off ammonia and produce a hydrogen zeolite structure containing dispersed molecules of heavy metal compound within the unit cells.

9. A method according to claim 8 wherein said hydrogen zeolite structure is calcined to a decationized molecular sieve.

10. A method according to claim 1 wherein said zeolite containing said heavy metal compound is subjected to treatment with acid to produce a hydrogen zeolite structure containing dispersed molecules of heavy metal compound within the unit cells.

11. A method according to claim 1 wherein said zeolite containing said heavy metal compound within the unit cells is contacted with an aqueous solution of a rare earth compound to form a rare earth substituted zeolite structure containing dispersed molecules of heavy metal compound within the unit cells.

12. A method according to claim 1 wherein said heavy metal ion is a metal selected from Groups I, II, VI and VIII of the Periodic Table.

13. A method of preparing a molecular sieve catalyst which comprises
  (a) contacting a large pore diameter hydrated crystalline sodium zeolite with an aqueous solution of a soluble salt of cobalt to replace sodium ions of the zeolite with cobalt ions by ion exchange,
  (b) removing unreacted cobalt salt from the cobalt-substituted zeolite,
  (c) contacting cobalt-substituted zeolite with an aqueous solution of sodium tungstate to convert at least part of said cobalt ions to cobalt tungstate in the unit cells of the zeolite structure
  (d) removing unreacted sodium tungstate from the cobalt tungstate-containing zeolite,
  (e) contacting the cobalt tungstate-containing zeolite with an aqueous solution of ammonium chloride to replace sodium ions in the zeolite with ammonium ions by ion exchange,
  (f) removing unreacted ammonium chloride from the ammonium-substituted zeolite containing cobalt tungstate, and
  (g) calcining the ammonium zeolite to drive off ammonia.

14. A method according to claim 13 wherein said soluble salt of cobalt is cobalt chloride.

15. A method according to claim 13 wherein unreacted cobalt salt is removed from said zeolite by washing with water.

16. A method according to claim 13 wherein said ammonium chloride is removed from said zeolite by washing with water.

17. A method according to claim 13 wherein said cobalt salt is maintained in contact with said zeolite for a period of at least two hours.

18. A method according to claim 17 wherein said zeolite is successively contacted with said aqueous solution of said cobalt salt.

19. A method according to claim 18 wherein said zeolite is washed with water following each of said successive contacts with said cobalt salt.

20. A method according to claim 13 wherein said cobalt tungstate-containing zeolite is successively contacted with ammonium chloride solution.

21. A method according to claim 20 wherein said cobalt tungstate-containing zeolite is washed with water following each of said successive contacts with ammonium chloride solution.

References Cited
UNITED STATES PATENTS

| | | | |
|---|---|---|---|
| 2,983,670 | 5/1961 | Seubold | 252—455 X |
| 3,236,762 | 2/1966 | Rabo et al. | 252—455 X |
| 3,304,254 | 2/1967 | Eastwood et al. | 252—455 X |
| 3,344,058 | 9/1967 | Miale | 252—455 X |

DANIEL E. WYMAN, *Primary Examiner.*

C. F. DEES, *Assistant Examiner.*